UNITED STATES PATENT OFFICE.

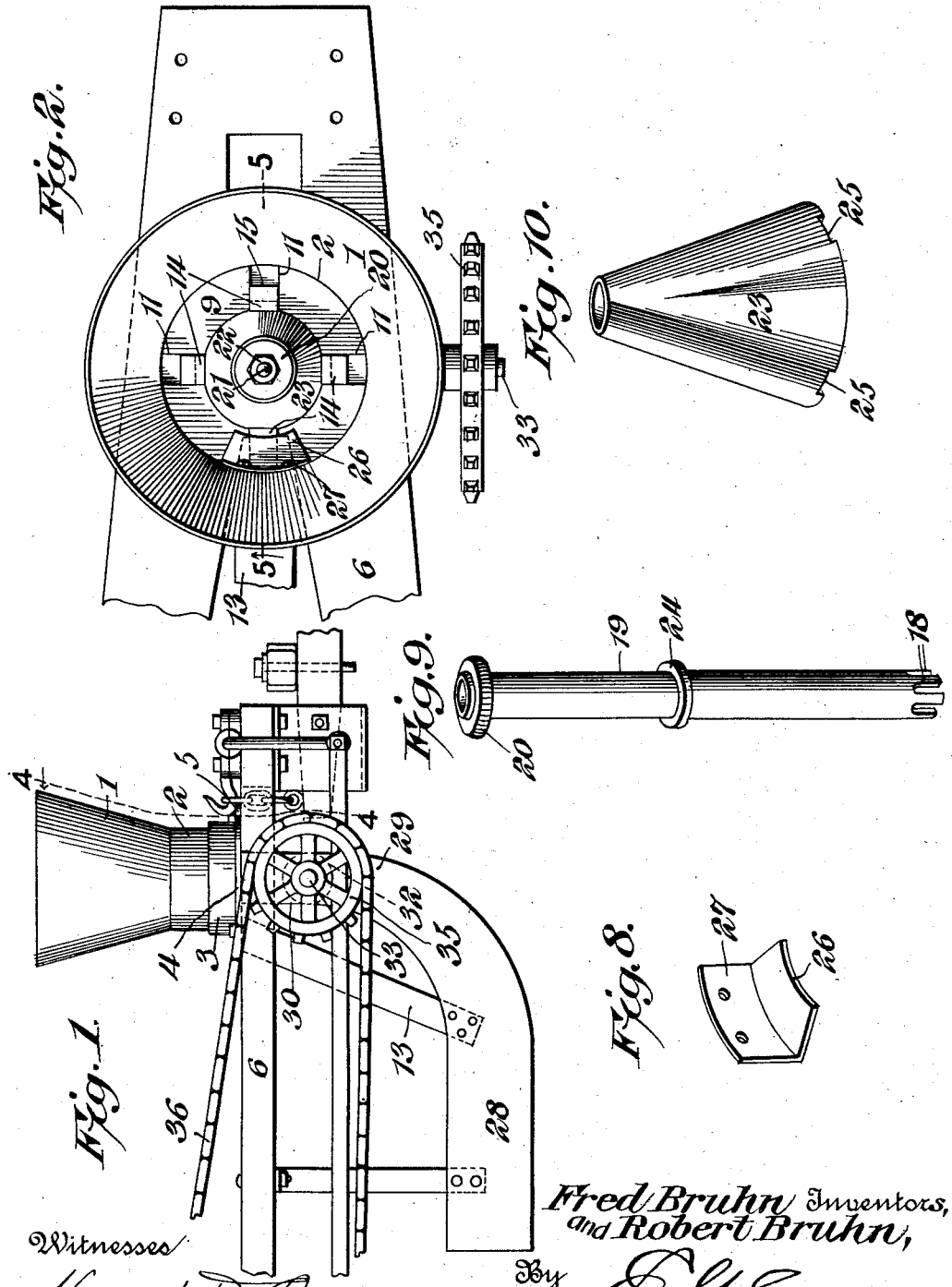

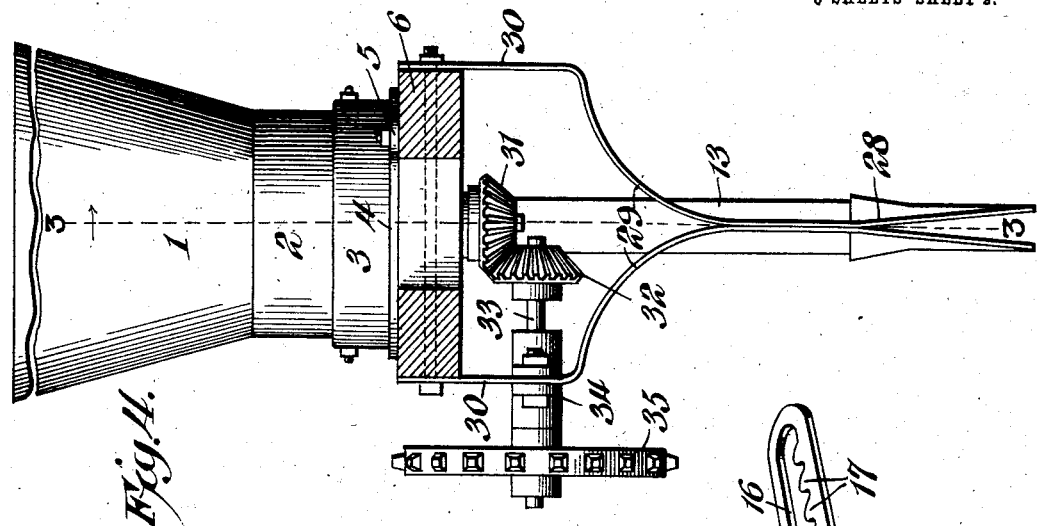
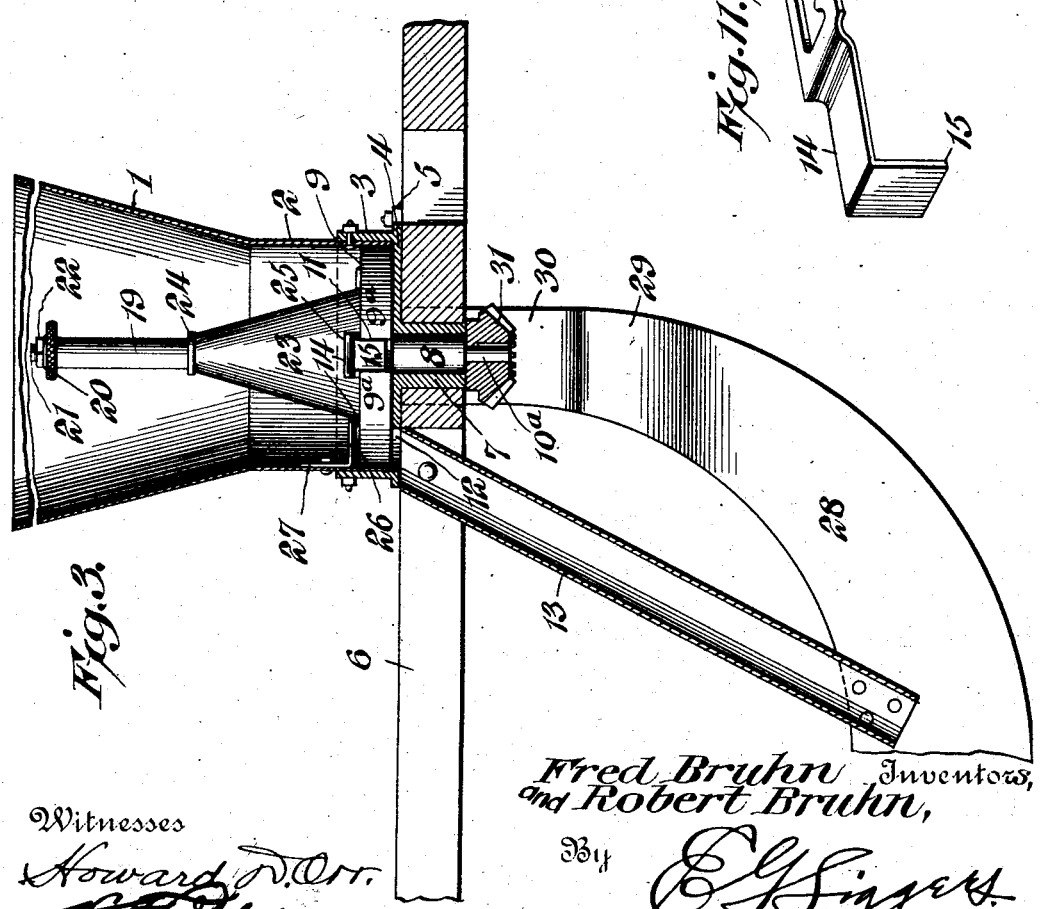

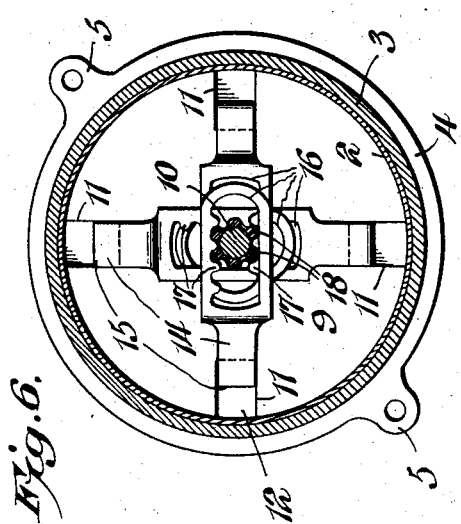
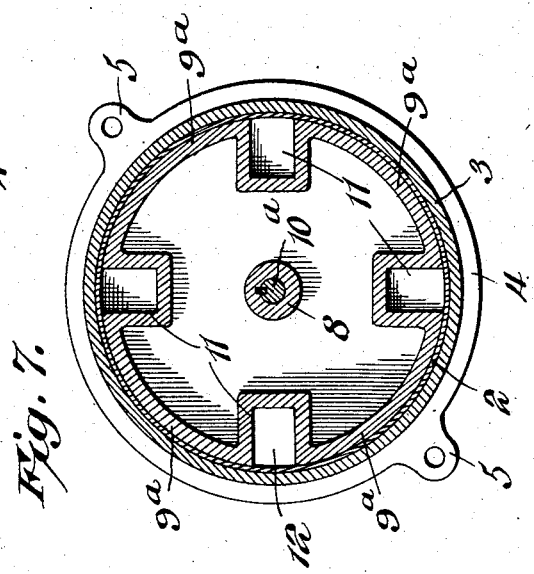
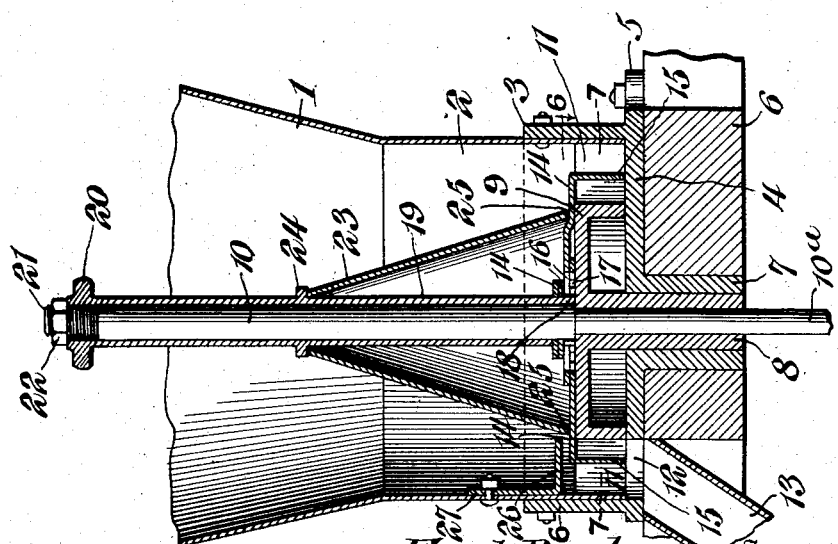

FRED BRUHN AND ROBERT BRUHN, OF VICKSBURG, MISSISSIPPI.

FERTILIZER-DISTRIBUTER.

997,367.      Specification of Letters Patent.     Patented July 11, 1911.

Application filed May 24, 1910. Serial No. 563,174.

*To all whom it may concern:*

Be it known that we, FRED BRUHN and ROBERT BRUHN, citizens of the United States, residing at Vicksburg, in the county of Warren and State of Mississippi, have invented a new and useful Fertilizer-Distributer, of which the following is a specification.

The invention relates to improvements in fertilizer distributers.

The object of the present invention is to improve the construction of fertilizer distributers, and to provide a simple, efficient and comparatively inexpensive fertilizer distributer, capable of accurately dropping at regular intervals a predetermined quantity of fertilizer, and adapted to be readily adjusted to vary the quantity discharged at each operation of the distributer, and designed primarily for use in connection with my plant setting and fertilizing machine, forming the subject-matter of a co-pending application, filed May 24, 1910, Serial No. 563,173.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a fertilizer distributer, constructed in accordance with this invention, Fig. 2 is a plan view of the same. Fig. 3 is a central longitudinal sectional view on the line 3—3 of Fig. 4, the conical casing being in elevation. Fig. 4 is a transverse sectional view on the line 4—4 of Fig. 1. Fig. 5 is an enlarged vertical sectional view, taken substantially on the line 5—5 of Fig. 2. Fig. 6 is a horizontal sectional view on the line 6—6 of Fig. 5. Fig. 7 is a similar view on the line 7—7 of Fig. 5. Fig. 8 is a detail perspective view of the curved plate, which is arranged over the discharge opening of the hopper or container. Fig. 9 is a detail perspective view of the tubular operating stem. Fig. 10 is a detail perspective view of the conical casing. Fig. 11 is a detail perspective view of one of the adjustable gages.

Like numerals of reference designate corresponding parts in all the figures of the drawings.

In the embodiment of the invention illustrated in the accompanying drawings, the hopper or container 1 consists of a sheet metal shell or body, tapered downwardly to within a short distance of the bottom and provided with a lower cylindrical portion 2, which is secured within an upwardly extending annular flange 3 of a circular base 4. The circular base, which may consist of a casting or be constructed in any other desired manner, is provided with a plurality of horizontally projecting ears 5, which are bolted, or otherwise secured to the frame 6 of the machine on which the fertilizer distributer is employed. The upwardly extending flange 3 is arranged vertically, and the base 4 is provided with a central depending tubular portion 7, fitted in a circular opening of the frame 6 and forming a bearing for a depending tubular journal or sleeve 8 of a rotary feed disk 9. The sleeve 8 is fixed to a lower reduced portion 10$^a$ of a vertical shaft 10 and to the rotary feed disk, which fits snugly within the cylindrical portion of the hopper, is provided at its periphery with a plurality of rectangular pockets or recesses 11, having opposite walls and an inner end wall and extending inwardly from the periphery of the feed disk. The pockets are open at the bottom, and their outer ends and the walls, which are vertical, extend downward to and rest upon the base of the hopper and space the body portion of the disk from the same. The side walls of each pocket are connected with the side walls of the adjacent pockets by curved rim sections 9$^a$, which form the periphery of the feed disk. The pockets are four in number to correspond with the sets of the plant carrying members of the aforesaid application, but they may be varied in number as will be readily understood.

The base of the hopper is provided at the back with a discharge opening 12, communicating with the upper end of an inclined spout 13, and adapted to permit the contents of the pockets 11 of the feed disk to be successively delivered to the spout through the rotary movement of the feed disk. The quantity of fertilizer delivered to the discharge spout is regulated by radially adjustable gages 14, each consisting of thin plates or pieces, arranged upon and rotating with the feed disk, and provided at its outer end with a depending arm 15, extending into the pocket 11 and terminating adjacent to the upper face of the base of the hopper. The gage plates are movable outwardly and inwardly toward and from the outer ends of the pockets, and are adapted to vary the size of the outer exposed portions thereof to regulate the quantity of fertilizer discharged at each operation of the distributer. The gages are each provided with an inner enlarged portion having an opening 16 and forming a loop to receive the vertical shaft 10. The inner enlarged portion of each of the gage plates is provided within its opening 16 at one side thereof with teeth 17, forming a rack and meshing with teeth 18 of a vertically disposed operating stem 19. The operating stem 19, which is tubular, is arranged on the shaft 10, and its lower end is slotted at intervals to provide the teeth 18 and to form a gear element for simultaneously actuating the gages. The tubular stem is provided at its upper end with a hand wheel 20 for enabling it to be readily rotated for adjusting the gages, and the upper end 21 of the shaft 10 is threaded for the reception of a nut 22, which engages the hand wheel and locks the tubular stem against rotary movement on the vertical shaft 10, whereby the gages are held in their adjustment.

The gear element or pinion formed by the teeth 18 and the inner portions of the gages are housed within a conical casing 23, seated upon the feed disk and held in place by a collar or flange 24, carried by and preferably formed integral with the tubular stem 19 and arranged at a point intermediate of the ends thereof, as clearly shown in Figs. 5 and 9. The nut 22, which secures the tubular stem and the gages in their adjustment, also operates to maintain the stem in engagement with the conical casing for holding the latter rigidly on the feed disk. The conical casing 23, which is provided at its lower edge with recesses 25 to permit the passage of the gages besides forming a housing for the gearing for operating the gages is adapted to direct the fertilizer to the pockets 11, and it is arranged in spaced relation with the walls of the hopper and forms a downwardly tapered annular space between it and the said walls for the fertilizer. The lower edge of the conical casing guides the gages in their inward and outward movement and is located adjacent the inner ends of the pockets 11.

The hopper is equipped with a curved horizontally disposed plate 26, located above the discharge opening and forming a cover for the pocket discharging into the spout and preventing the fertilizer from passing directly from the hopper to the spout. The plate 26 is provided at its outer edge with an upwardly extending flange 27, bolted or otherwise secured to the inner face of the wall of the hopper.

The discharge spout 13, which is inclined downwardly and rearwardly, is secured at its upper end to the frame and at its lower end to sides or members 28 of a furrow opener. The sides or members of the furrow opener, which are constructed of suitable material, are curved downwardly and extend rearwardly and they have upper diverging portions 29 and vertical terminal portions 30, secured to the opposite sides of the frame.

Motion is communicated to the feed disk by beveled gears 31 and 32, connecting the vertical shaft 10 with a horizontal shaft 33, journaled in suitable bearings 34, which are mounted upon one of the sides or members of the furrow opener. The horizontal shaft 33 may be mounted in any other desired manner, and it carries a sprocket wheel 35, which is connected by a sprocket chain 36 with the rotary plant setter of the aforesaid application. Any other suitable means, however, may be employed for rotating the feed disk.

Having thus fully described our invention, what we claim as new and desire to secure by Letters Patent, is:—

1. A fertilizer distributer including a hopper comprising a tapered shell having a lower cylindrical portion, and a base having an outlet and provided with a vertical annular flange secured to the lower cylindrical portion of the said shell, a rotary feed disk arranged upon the said base and located within the cylindrical portion of the shell and provided at its periphery with pockets open at and extending inwardly from the periphery of the feed disk, said feed disk also having connecting rim portions fitting the lower cylindrical portion of the hopper, and means for rotating the feed disk to carry the pockets successively to the said outlet.

2. A fertilizer distributer including a hopper comprising a shell having a lower cylindrical portion, and a base consisting of a horizontal disk or plate provided with an outlet and having a depending central tubular bearing portion and provided with a vertical flange secured to the cylindrical portion of the shell, said base being also provided with an outlet, a feed disk provided with pockets and having a depending sleeve forming a journal and arranged in the tubular bearing portion of the base, a shaft extending through the sleeve, and gearing connected with the shaft for rotating the feed disk.

3. A fertilizer distributer including a hopper comprising a downwardly tapered shell having a lower cylindrical portion, a base consisting of a horizontal disk or plate provided with an outlet and having a central depending tubular portion and provided also with a vertical flange secured to the cylindrical portion of the shell, a feed disk provided with a central depending tubular sleeve fitted in the tubular bearing of the base, said disk being also provided at its periphery with inwardly extending horizontal pockets and having rim portions connecting the adjacent sides of the pockets and fitting the inner face of the lower cylindrical portion of the hopper, a shaft extending through the sleeve of the feed disk, and gearing connected with the shaft for rotating the said disk.

4. A fertilizer distributer including a hopper comprising a downwardly tapered shell having a lower cylindrical portion, a base provided with an outlet and having a central depending tubular portion and provided also with a vertical flange secured to the cylindrical portion of the shell, a feed disk provided with a central depending tubular sleeve fitted in the tubular bearing of the base, said disk being also provided at its periphery with inwardly extending pockets and having rim portions connecting the adjacent sides of the pockets and fitting the inner face of the lower cylindrical portion of the hopper, a horizontal plate arranged within and supported by the hopper in spaced relation with the outlet to form a cover for the pockets when the same are discharging at the said outlet, a shaft extending through the sleeve of the feed disk, and gearing connected with the shaft for rotating the said disk.

5. A fertilizer distributer including a hopper, a rotary feed disk provided with pockets, gages provided at their inner portions with racks and having outer portions arranged at the pockets and adapted to cover and close a portion of the same to vary the size of the pockets, a gear element meshing with the said racks, and means for rotating the gear element for simultaneously adjusting the gages.

6. A fertilizer distributer including a hopper, a rotary feed disk provided with a plurality of pockets, a plurality of radially arranged gage members provided at their inner portions with racks, a shaft connected with the disk for rotating the same, a gear element mounted on the shaft and meshing with the racks for simultaneously adjusting the gages, and means for operating the gear element.

7. A fertilizer distributer including a hopper, a rotary feed disk provided with a plurality of pockets, a plurality of radially arranged gage members provided at their inner portions with racks, a shaft connected with the disk for rotating the same, a tubular stem arranged on the shaft and provided with a gear element meshing with the racks for simultaneously adjusting the gages, and means for securing the stem in its adjustment.

8. A fertilizer distributer including a hopper, a rotary feed disk provided with a plurality of pockets, a plurality of radially arranged gage members provided at their inner portions with racks, a shaft connected with the disk for rotating the same, a vertical tubular stem arranged on the said shaft and provided at its upper end with operating means and having teeth at its lower end meshing with the racks for simultaneously adjusting the gages, and means for securing the stem in its adjustment.

9. A fertilizer distributer including a hopper, a rotary feed disk arranged within the hopper and provided with pockets, a plurality of gages carried by the feed disk and movable inwardly and outwardly with respect to the pockets and having arms extending into the same, said gages being arranged to vary the size of the pockets and provided at their inner portions with racks, a vertical shaft connected with the feed disk, and a tubular stem arranged on the shaft and carrying teeth to mesh with the racks for simultaneously adjusting the gages.

10. A fertilizer distributer including a hopper, a rotary feed disk provided with pockets, a vertical shaft connected with the feed disk for rotating the same, gages arranged upon the feed disk and having outer portions coöperating with the pockets to vary the size thereof, said gages being provided at their inner portions with openings to receive the shaft and having teeth located at one side of each opening, and a tubular stem mounted on the shaft and meshing with the teeth for adjusting the gages.

11. A fertilizer distributer including a hopper, a rotary feed disk provided with pockets, gages mounted on the feed disk and movable inwardly and outwardly with respect to the pockets for varying the size thereof, operating means connected with the inner portions of the gages for actuating the same, and a tubular casing forming a housing for the operating means and guiding the gages in their inward and outward movement and having inclined sides extending to the upper face of the feed disk arranged to spread the fertilizer and to direct the same to the said pockets.

12. A fertilizer distributer including a hopper, a rotary feed disk arranged at the bottom of the hopper and provided with pockets, a vertical shaft connected with the feed disk and extending upwardly into the hopper, gages carried by the feed disk and movable inwardly and outwardly with respect to the pockets for varying the size of the same, said gages being provided at their inner portions with racks, a tubular stem arranged on the shaft and provided with teeth meshing with the racks of the gages, said stem being also provided at an intermediate point with a collar, and a conical casing arranged upon the feed disk and engaged by the collar and forming a housing for the racks and the teeth.

13. A fertilizer distributer including a hopper, a rotary feed disk arranged at the bottom of the hopper and provided with pockets, a vertical shaft connected with the feed disk and extending upwardly into the hopper, gages carried by the feed disk and movable inwardly and outwardly with respect to the pockets for varying the size of the same, said gages being provided at their inner portions with racks, a tubular stem arranged on the shaft and provided with teeth meshing with the racks of the gages, said stem being also provided at an intermediate point with a collar, and a conical casing arranged upon the feed disk and engaged by the collar and forming a housing for the racks and the teeth and provided at its lower edge with recesses receiving and guiding the gages.

14. A fertilizer distributer including a hopper, a feed disk arranged at the bottom of the hopper and provide with pockets, a vertical shaft connected with the feed disk and extending upwardly into the hopper and having a threaded upper portion, a plurality of gages carried by the feed disk and provided at their inner portions with teeth and movable inwardly and outwardly with respect to the pockets to vary the size of the same, a tubular stem arranged on the shaft and provided with teeth meshing with the racks of the gages for simultaneously actuating the same, and a nut mounted on the threaded portion of the shaft and engaging the tubular stem for securing the same in its adjustment.

15. A fertilizer distributer including a hopper, a feed disk arranged at the bottom of the hopper and having pockets, a vertical shaft connected with the feed disk and extending upwardly into the hopper and having a threaded portion, gages carried by the feed disk and provided at their inner portions with racks and movable inwardly and outwardly to vary the size of the pockets, a tubular stem arranged on the shaft and provided with teeth to mesh with the racks and having an exterior collar, a tapered casing mounted upon the feed disk and engaged by the collar of the stem and guiding the gages in their inward and outward movement, and a nut mounted on the threaded portion of the shaft and engaging the tubular stem for securing the latter in its adjustment and for holding the collar thereof against the casing.

In testimony, that we claim the foregoing as our own, we have hereto affixed our signatures in the presence of two witnesses.

FRED BRUHN.
ROBERT BRUHN.

Witnesses:
W. H. Dupré,
J. E. Gallagher.

---

Copies of this patent may be obtained for five cents each, by addressing the "Commissioner of Patents, Washington, D. C."